United States Patent
Lassota

(10) Patent No.: US 6,783,089 B2
(45) Date of Patent: Aug. 31, 2004

(54) FOOD INGREDIENT GRINDER ASSEMBLY AND METHOD

(75) Inventor: Zbigniew G. Lassota, Long Grove, IL (US)

(73) Assignee: Food Equipment Technologies Company, Inc., Lincolnshire, IL (US)

( * ) Notice: Subject to any disclaimer, the term of this patent is extended or adjusted under 35 U.S.C. 154(b) by 0 days.

(21) Appl. No.: 09/397,834

(22) Filed: Sep. 17, 1999

(65) Prior Publication Data

US 2003/0025012 A1 Feb. 6, 2003

(51) Int. Cl.$^7$ ................................................ A47J 42/40
(52) U.S. Cl. ........................... 241/30; 241/34; 241/36; 241/100
(58) Field of Search .................... 241/36, 37.5, 34, 241/100, 30

(56) References Cited

U.S. PATENT DOCUMENTS 5,386,944 A * 2/1995 Knepler et al. ............... 241/36
5,671,657 A * 9/1997 Ford et al. .................... 99/286

* cited by examiner

Primary Examiner—Mark Rosenbaum
(74) Attorney, Agent, or Firm—James W. Potthast; Potthast & Associates

(57) ABSTRACT

A food ingredient grinder assembly (10) having ingredient hoppers (12) and grinding blades (20) for grinding ingredient upon receipt within grinding chamber (14) has a controller that maintains a motor (38) operating after the ingredient in the grinding chamber has been depleted to vibrate and blow away residual ground ingredient from interior surfaces of the grinder assembly to reduce contamination of different type of ingredient subsequently ground in the same grinding chamber and passed to a brew basket (24) through the same outlets and manifold (50). In one embodiment the grinding blades are controlled according to a preselected time period and in another embodiment the control is based on the net weight of the ground ingredient within the brew basket (24) which is measured through use of strain gages (30).

24 Claims, 8 Drawing Sheets

FOOD INGREDIENT GRINDER ASSEMBLY AND METHOD

BACKGROUND OF THE INVENTION

1. Field of the Invention

This invention generally relates to powered, food ingredient grinding machines, such as powered coffee bean grinders, and more particularly to control systems and control methods for such grinding machines.

2. Discussion of the Prior Art

Known powered food ingredient grinders, or grinder assemblies are well known. They generally have a frame, an ingredient hopper and a grinding chamber with an inlet for receiving unground ingredient from the hopper, powered grinding blades for grinding the ingredient and an outlet mounted to the frame. An electric motor is mechanically linked to the powered grinding blades, and when electrical power is applied to the electric motor the blades are caused to rotate and grind any ingredient that may be contained within the grinding chamber. The coffee beans or other ingredient to be ground is dumped into the hopper. A gate closure at the bottom of the hopper is opened during grinding to drop ingredient into the grinding chamber. A mounting member removably mounts a brew basket with a paper filter beneath the grinding chamber. The ground ingredient passes from the grinding chamber through an open outlet at the bottom of the chamber and drops into the brew basket.

It is known in the control systems for known grinders to start a grinding cycle by manually actuating a start button after one of a plurality of preselected grinding amounts are selected and then to automatically stop the grinding after a preselected time period after the start of the grinding cycle having a duration corresponding to the preselected amount that has been selected. When the grinding cycle is started the closure gate of the hopper outlet is opened automatically and simultaneously electrical power is applied to the motor to start rotation of the grinding blades. When the time period associated with the selected amount has lapsed, the closure gate is closed and generally simultaneously the electrical power is removed from the motor and the grinding blades stop grinding.

One of the problems or disadvantages in the known food ingredient grinders that the present inventor has determined is that because the amount of ingredient that is ground is determined strictly based on the length of time that the hopper outlet closure gate is held open, depending upon the moisture content and density of the ingredient and the relative size of the ingredient particles, greater or lesser amounts of coffee may be passed from the hopper to the grinder during identical time periods associated with the different preselected time periods that the closure gate is kept open for a given grinding cycle. This can result in brew strength inconsistency between successive brews using ingredients from different grinding cycles that are supposed to have the same quantity of ingredient for each cycle but which are in fact different amounts.

Another problem with known food ingredient grinders is that due to the grinding blades being stopped approximately simultaneously with the closure of the hopper outlet, residual amounts of ground ingredient will remain in the grinding chamber and in the manifold or chute from the grinding chamber to the ground ingredient outlet. This residual ground ingredient can then contaminate subsequent ingredient of a different type that is to ground in the same grinding chamber. This again can lead to inconsistent taste of a beverage brewed from the contaminated ground ingredient.

SUMMARY OF THE INVENTION

It is therefore the object of the present invention to provide a food ingredient grinder and method of grinding in which the aforementioned problems are reduced or eliminated.

This is achieved in part by providing in a grinder assembly for grinding a food ingredient having a frame, an ingredient hopper and a grinding chamber with an inlet for receiving unground ingredient from the hopper, powered grinding blades for grinding the ingredient and an outlet mounted to the frame, a control system, comprising means for mounting a brew basket in alignment with the grinding chamber outlet to receive ground ingredient, means for directly measuring the quantity of ground ingredient received within the brew basket and means responsive to the measuring means for controlling the powered cutting blades.

In the preferred embodiment the directly measuring means includes means for measuring the net weight of the ingredient within the brew basket including means for weighing the brew basket and the ingredient contained within the brew basket to determine the gross weight of both the ingredient and the brew basket, means for automatically subtracting the weight of only the brew basket from the gross weight to determine the net weight of only the ingredient in the brew basket. Preferably, the controlling means includes means for storing a preselected ingredient quantity and means responsive to the measuring means for terminating power to the powered cutting blades after the quantity of ground ingredient received within the brew basket equals the preselected quantity.

Thus, in accordance with the food ingredient grinding method of the present invention, in a grinder assembly for grinding a food ingredient having a frame, an ingredient hopper and a grinding chamber with an inlet for receiving unground ingredient from the hopper, powered grinding blades for grinding the ingredient and an outlet mounted to the frame, the ingredient is ground by performing the steps of mounting a brew basket in alignment with the grinding chamber outlet to receive ground ingredient, directly measuring the quantity of ground ingredient received within the brew basket, and responding to the measuring means for controlling the powered cutting blades.

In accordance with another important aspect of the invention, provided in a grinder assembly for grinding a food ingredient having a frame, an ingredient hopper with an outlet, and a grinding chamber with an inlet for receiving unground ingredient from the hopper, an electric motor, powered grinding blades in the grinding chamber for grinding the ingredient, and an outlet chute mounted to the frame for passing ground ingredient out from the grinding chamber is a control system, comprising a closure member mounted for movement between a nonblocking position to a blocking position in which passage of unground ingredient from the ingredient hopper to the grinding chamber is blocked, an actuator for automatically moving the closure member from the nonblocking position to the blocking position when a preslected amount of ingredient has been ground during a grinding cycle, and means for automatically terminating power to the electric motor only after a preselected time period after automatic movement by the actuator of the closure member from the nonblocking position to the blocking position.

Preferably, the automatically terminating means includes means for sensing when the actuator has moved the closure to the blocking position, and a timer for measuring the preselected time period, means responsive to lapse of the preselected time period being measured by the timer to terminate power to the electric motor.

Thus, in accordance with the method of controlling a grinder assembly for grinding a food ingredient having a frame, an ingredient hopper with an outlet, and a grinding chamber with an inlet for receiving unground ingredient from the hopper, an electric motor, powered grinding blades in the grinding chamber for grinding the ingredient, and an outlet chute mounted to the frame for passing ground ingredient out from the grinding chamber, the grinder assembly is controlled by performance of the steps of automatically moving a closure member from a nonblocking position to a blocking position blocking position in which passage of unground ingredient from the ingredient hopper to the grinding chamber is blocked when a preslected amount of ingredient has been ground during a grinding cycle and automatically terminating power to the electric motor only after a preselected time period after automatic movement by the actuator of the closure member from the nonblocking position to the blocking position. Preferably, in accordance with the method of controlling the step of automatically terminating includes the steps of sensing when the actuator has moved the closure to the blocking position, measuring the preselected time period, and responding to lapse of the preselected time period being measured by the timer to terminate power to the electric motor. Preferably, the time period is on the order of seven seconds.

BRIEF DESCRIPITON OF THE DRAWINGS

The foregoing advantageous features of the invention will be described in greater detail and other advantageous feature of the invention will be made apparent from the detailed description of the preferred embodiment that is given with reference to the several figures of the drawings, in which.

Figure 4A:
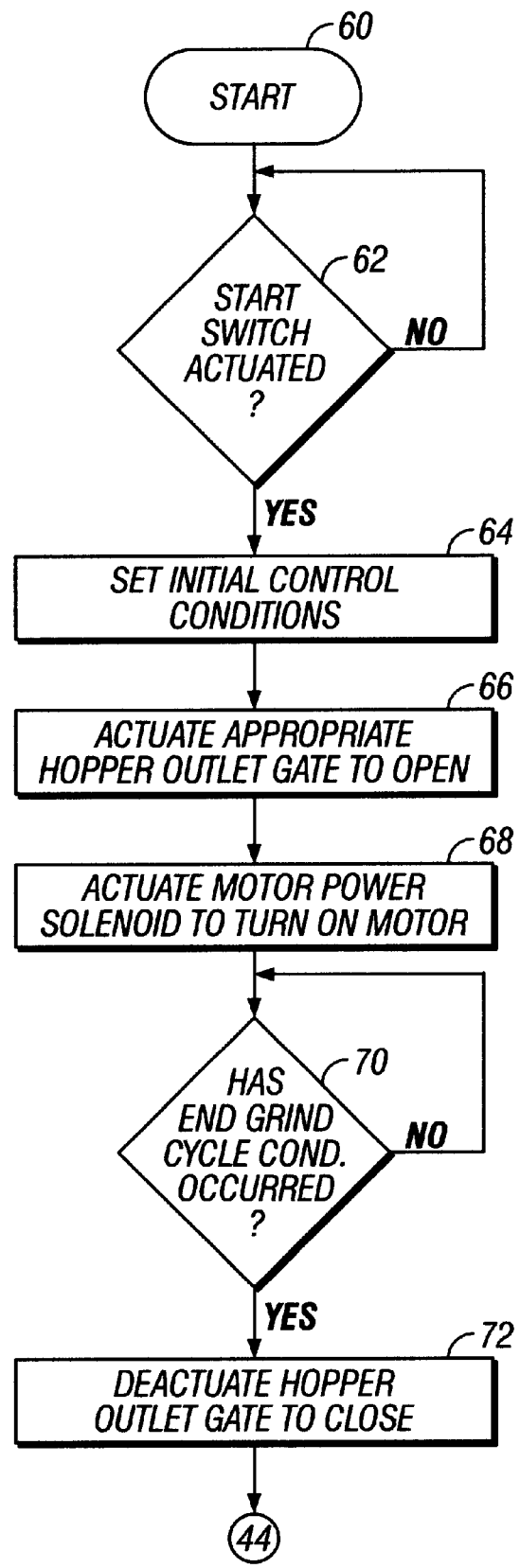
FIGS. 4A and 4B are a logic flow chart illustrating the preferred operation of the controller of FIG. 3.
Figure 4B:
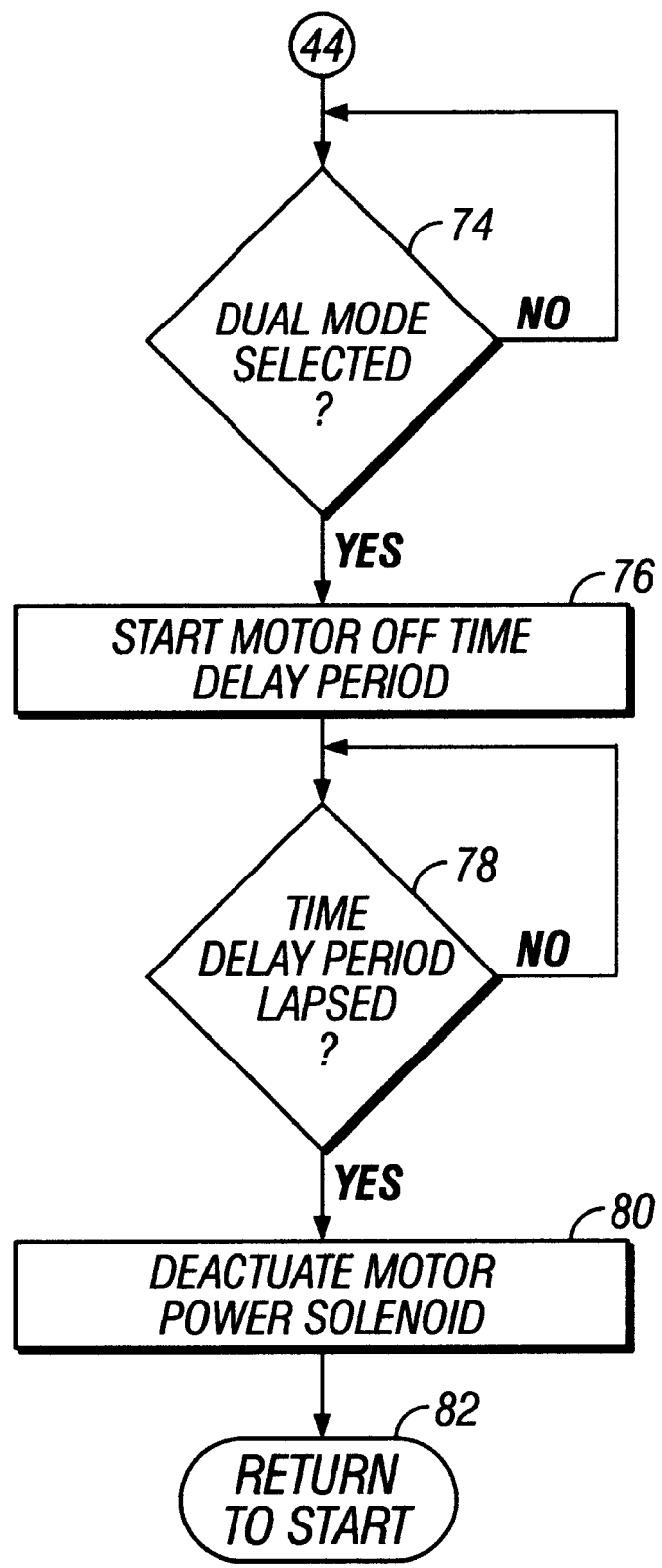
Figure 4C:
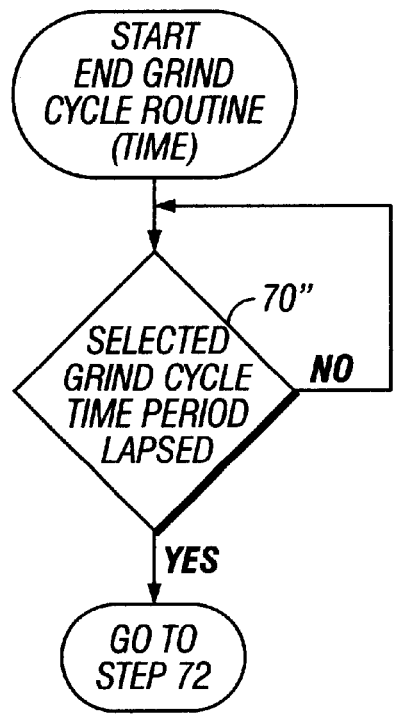
Figure 4D:
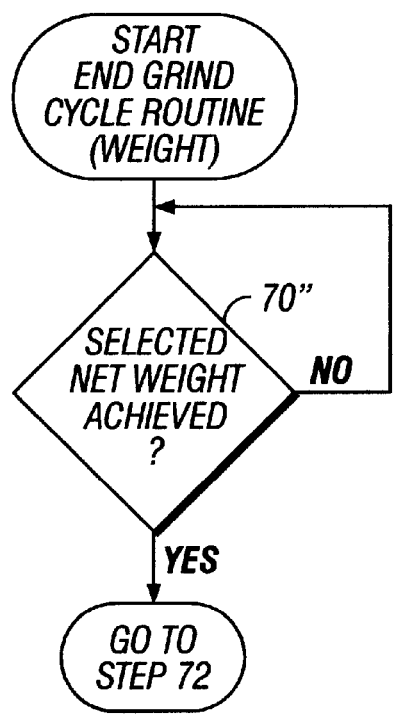

FIGS. 4C and 4D is a flow chart of the "End Grind Cycle Condition Detection" subroutine shown as a single step in the flow chart of when the grinding is controlled by timers; and FIG. 4B is a flow chart of the "End Grind Cycle Condition Detection" subroutine shown as a single step in the flow chart of FIG. 4 when the grinding is controlled by the weight of the brew basket and ground ingredient contained in the brew basket.

DETAILED DESCRIPTION

Figure 1:
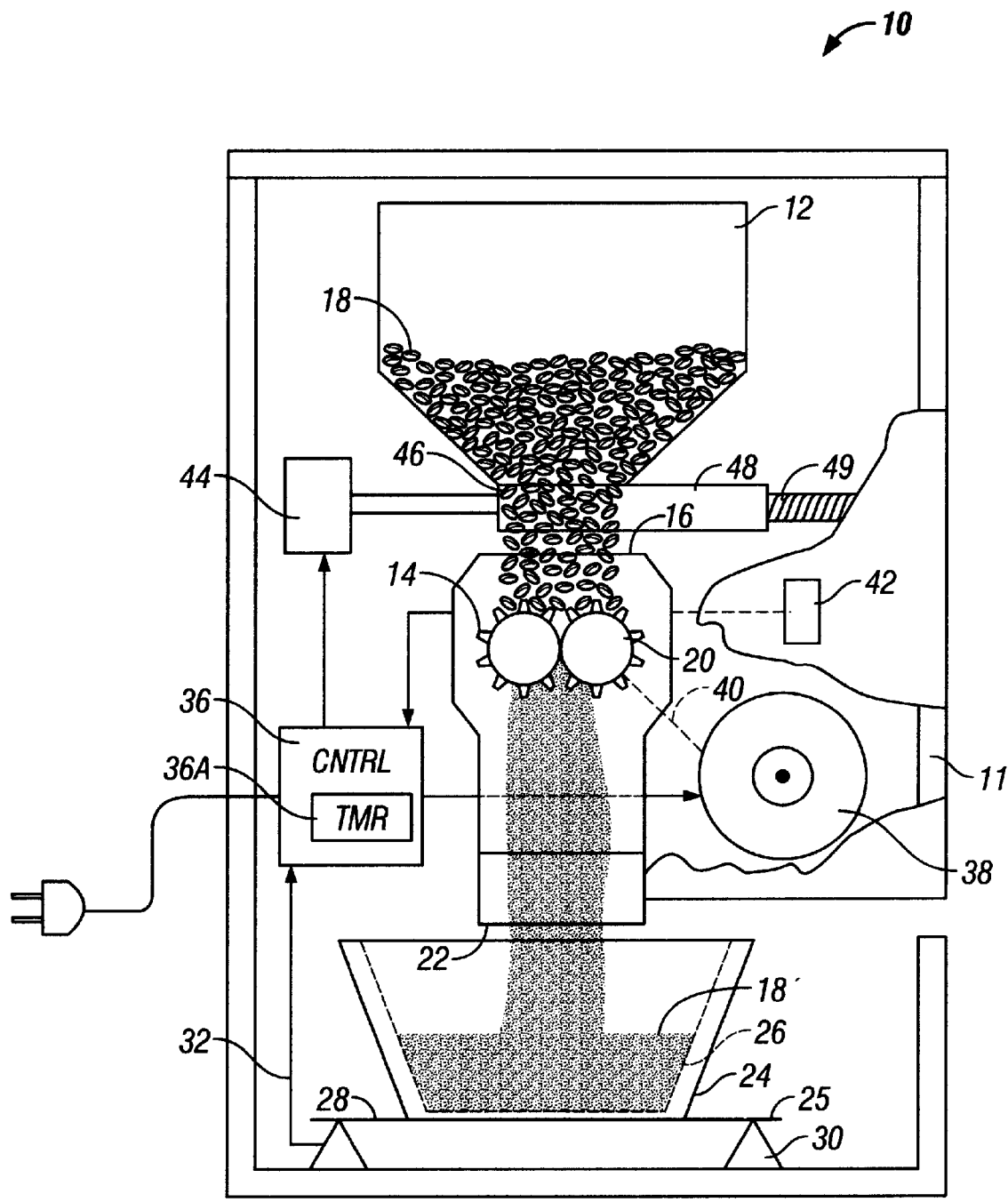
FIG. 1 is a schematic representation of the preferred embodiment of the food ingredient grinder assembly of the present invention.

Referring now to FIG. 1, a preferred embodiment of the grinder assembly 10 of the present invention is seen to include a number of features including a frame 11 within which is mounted to an ingredient hopper 12, a grinding chamber 14 with an inlet 16 for receiving unground ingredient 18, such as coffee beans, from the hopper 12, and powered grinding blades 20 for grinding the unground ingredient 18 into ground ingredient 18', such as ground coffee. The ground ingredient passes from the outlet 22 of the grinding chamber 14 and falls into a brew basket 24 that is mounted on a support 25 beneath the outlet 22. The brew basket 24 contains a paper filter 26 which contains the ground ingredient 18' that passes into the brew basket 24.

In one embodiment of the invention means for directly measuring the quantity of ground ingredient 18' received within the brew basket 24 is provided in the form of a scale platform 28 upon which the brew basket 24 is supported and which is linked with strain gages 30 to provide an electrical gross weight signal representative of the combined weight of the brew basket 24, the filter 26 and the ground ingredient 18'. This gross weight signal is passed on a line 32 to a controller 36 which is responsive to the weight signal from the strain gages 30 of the measuring means for controlling the powered grinding blades 20. In another form of the invention, the grinding is controlled in accordance with a timer 36A of the controller 36.

The powered cutting blades 20 are powered by an electrical motor 38 that is linked to the grinding blades 20 by means of a suitable mechanical linkage 40. When the weight signal on line 32 indicates that a preselected net weight has been reached the, then the controller removes electrical power from an electrical power source connected to an AC outlet plug to the electric motor which stops the grinding of the blades 20. In the other embodiment, power is removed from the electrical motor when the preselected time period being measured by the timer 36A lapses.

Power is first applied to the motor 38 when a start switch 42 is manually actuated by an operator of the grinder assembly 10. When this occurs, in the one embodiment the controller 36 measures the net weight of the ingredient 18' within the brew basket 24. The weight of only the brew basket 24 and the filter paper 26 is subtracted from the gross weight to determine the net weight of only the ingredient 18' in the brew basket. In the controller 36 there is memory that stores a preselected ingredient quantity net weight after the net weight is equal to this net weight, power to the powered cutting blades 20 is terminated.

Once the start grinding cycle switch 42 is actuated, the controller 36 energizes a hopper outlet solenoid 44 that pushes open a gate 48 to open an outlet 46 from the hopper 12 to the grinding chamber 14 and applies power to the electrical motor 38. The unground ingredient 18 falls from the hopper outlet 46 when open into the grinding chamber 14 and is ground until the gate 48 is again closed. A bias spring 49 returns the gate 48 to the closed position when the solenoid is again de-energized. At the end of the grinding cycle, either when the preselected net weight has been reached or a preselected time period since actuation of the start switch has passed, the hopper outlet solenoid 44 is de-energized, and the gate 48 is closed to stop any further inflow of unground ingredient 18 into the grinding chamber 14.

Figure 2A:
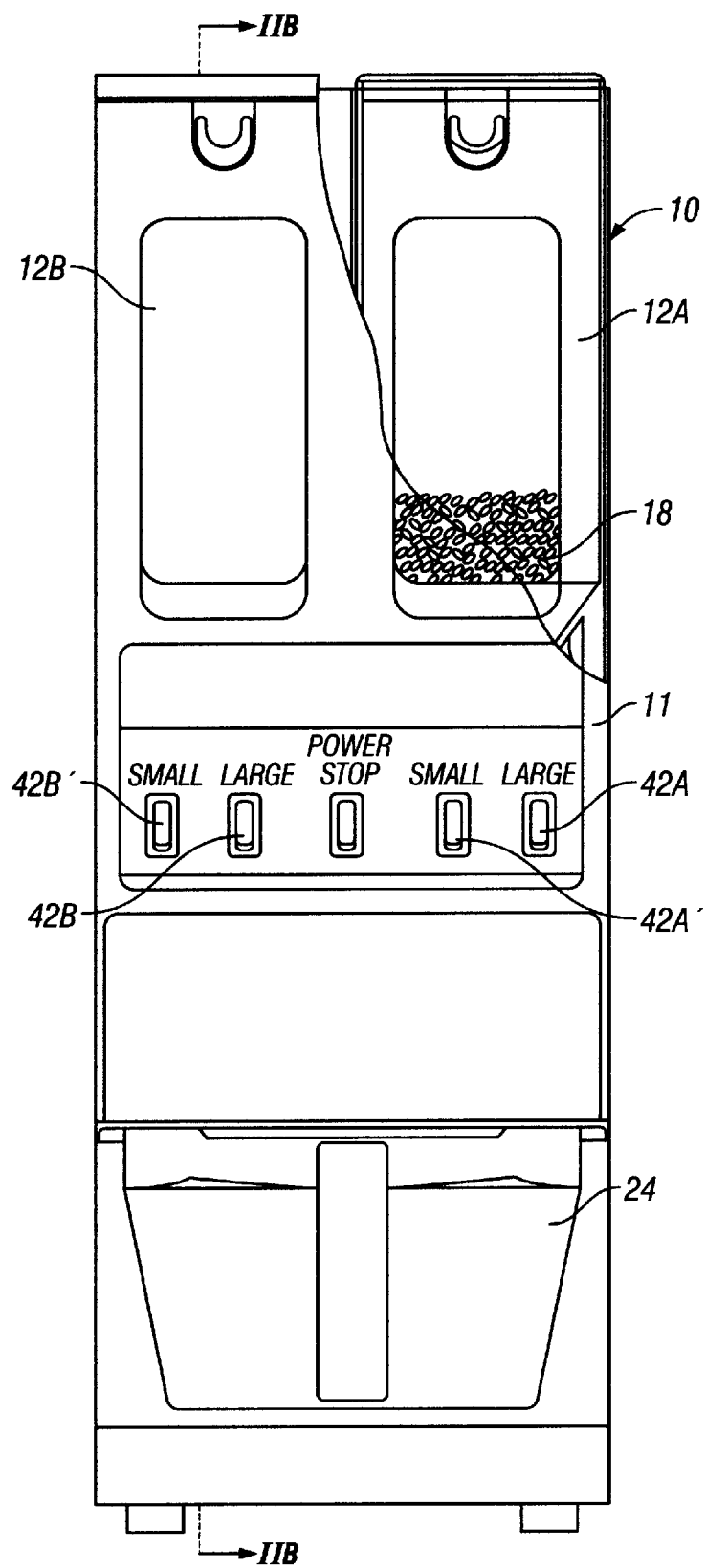
FIG. 2A is an elevational view of a form of the grinder assembly of claim 1 in which there are two hoppers that selectively feed unground ingredient into the grinding chamber with a portion broken away to show one of the hoppers contained within the grinder housing.
Figure 2B:
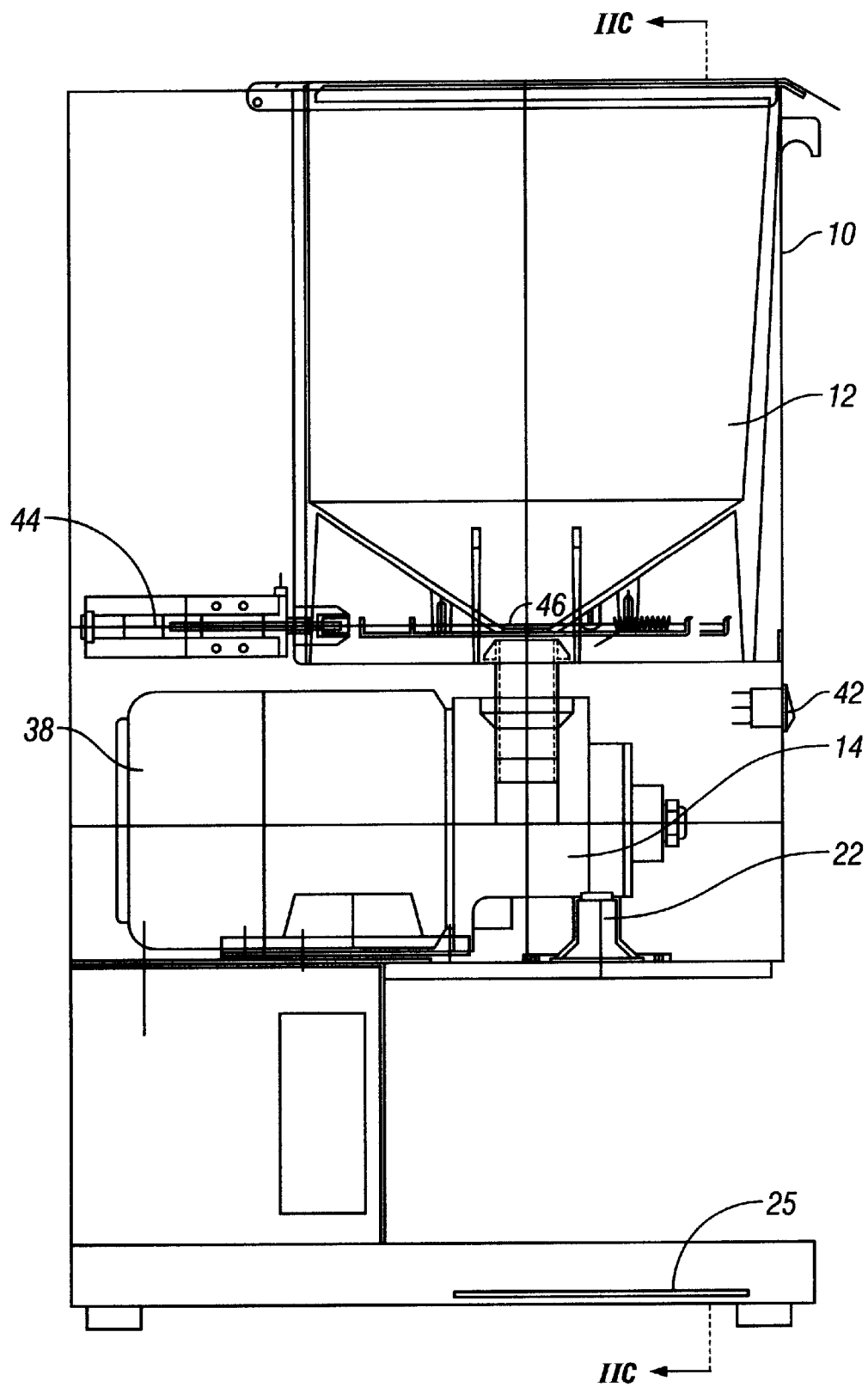
FIG. 2B is a schematic sectional side view taken along section line IIA—IIA of the grinder assembly of FIG. 2A.

In accordance with an important aspect of the invention, whether the grinding cycle is controlled by either weight or by lapse of a time period, the controller does not necessarily terminate power to the motor at the same time that the hopper gate is closed. Instead, power remains applied to the motor and the grinding blades continue to rotate at high speed after the grinding chamber is empty, because it has been discovered by the inventor that by so doing the residual ground ingredient 18' in the grinding chamber, the grinding chamber outlet and, in the case of a dual hopper grinder assembly, as shown in FIGS. 2A and 2B, the manifold leading from the hopper outlets to the inlet of the grinding chamber is blown and vibrated free from the interior surfaces of these elements to prevent subsequent contamination of different type of ingredient that may be ground in the same grinder assembly 10. The controller 36 includes a timer for establishing a time delay period, and means responsive to the end of grinding cycle condition that closes the hopper gate, either the quantity of ground ingredient 18' received within the brew basket equaling the preselected quantity or the lapse of the grinding cycle time period to start the grinding time delay period. When the grinding time delay period has lapsed, the controller 36 responds by terminating power to powered grinding blades motor 38. It has been empirically determined that a grinding time delay on the order of seven seconds generally maximizes the residual ingredient removal from the interior surfaces.

Figure 2C:
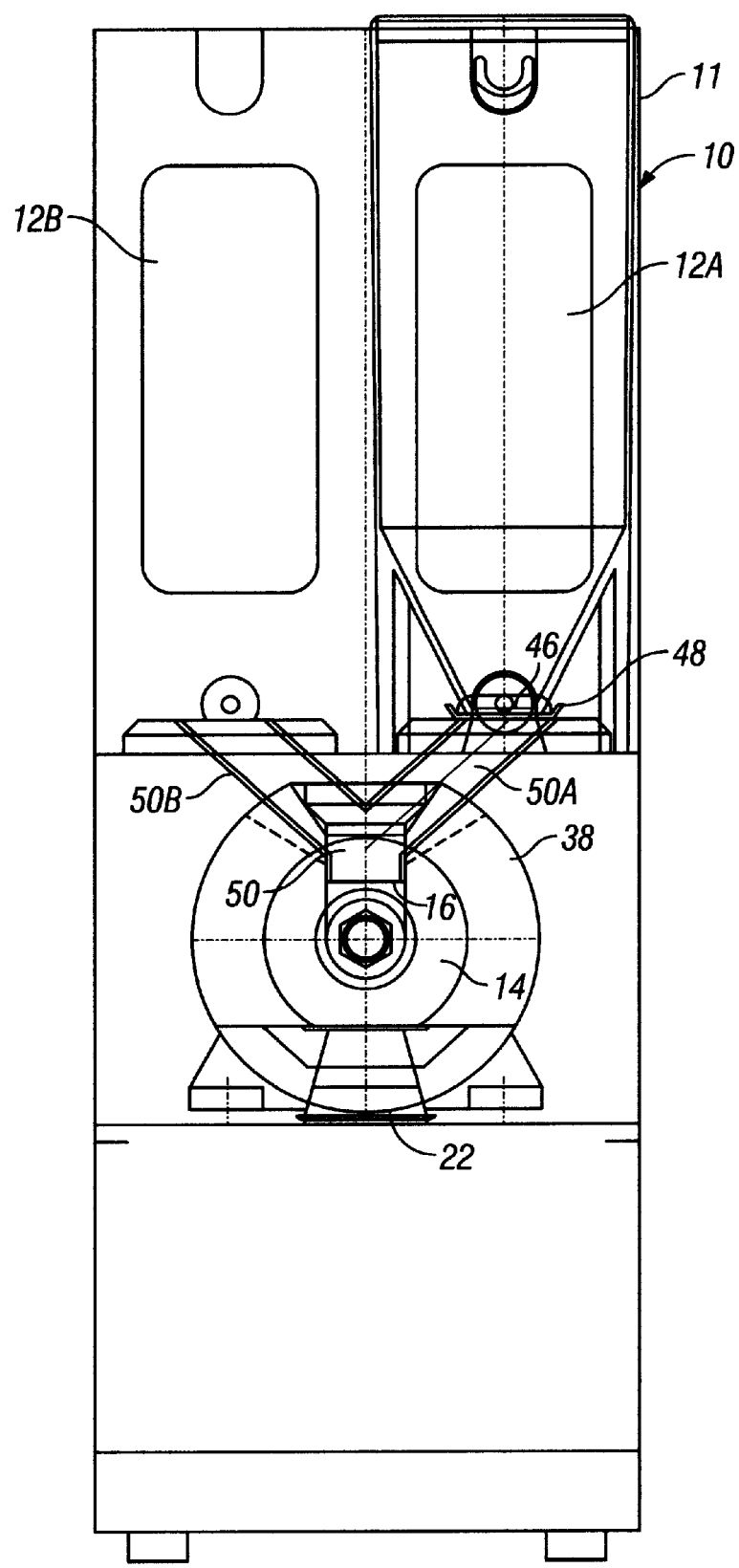
FIG. 2C is a schematic sectional side view taken along section line IIC—IIC of FIG. 2A.
Figure 3:
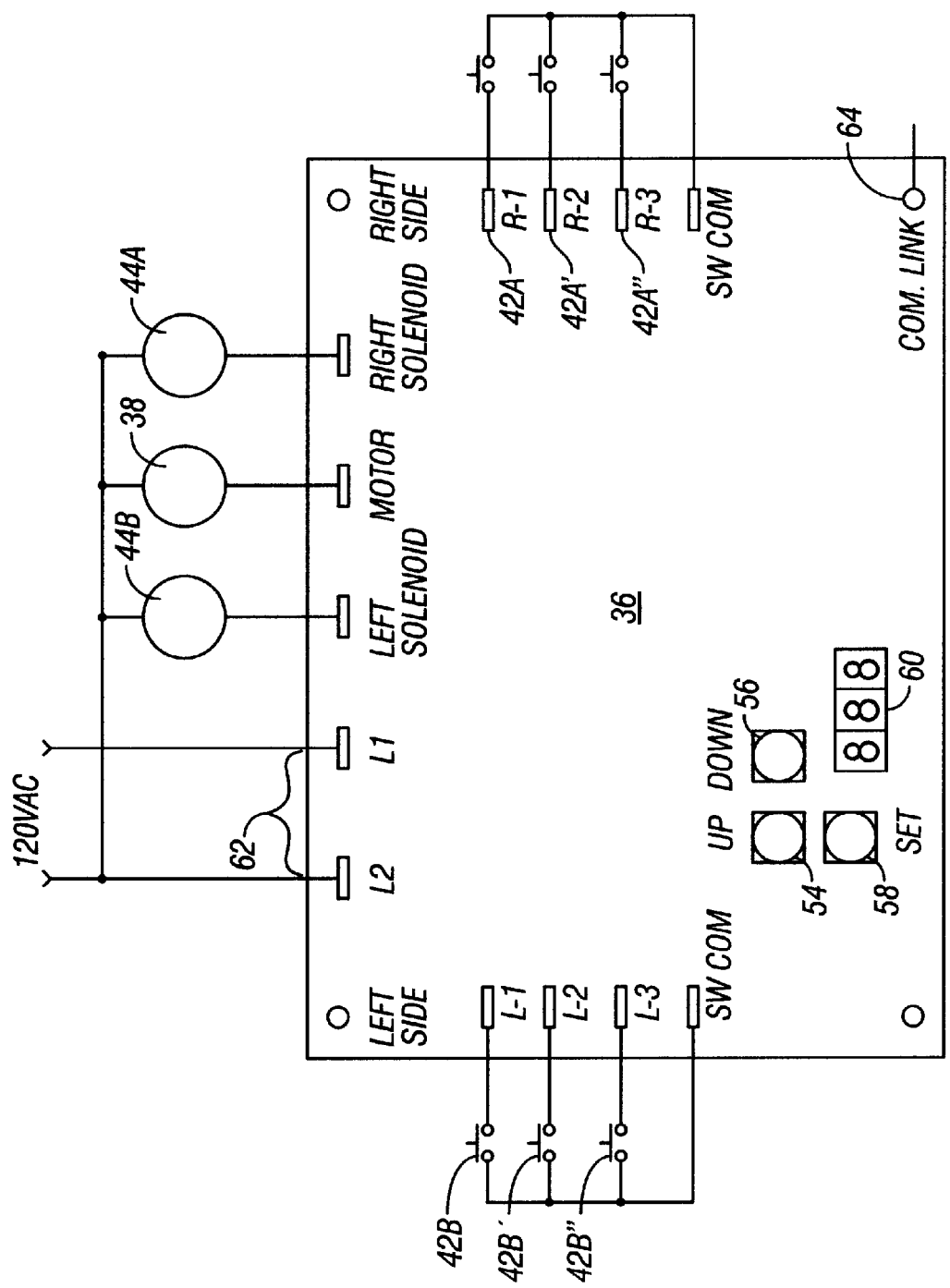
FIG. 3 is a circuit schematic of the preferred embodiment of the controller shown as a single functional block in FIG. 1.

Referring now to FIGS. 2A, 2B and 2C, an actual embodiment of the invention in the form of a double hopper grinder assembly 10' in which all of the parts corresponding to those of FIG. 1 have been given the same or similar references numerals. As seen in FIG. 2A there are two removable hoppers 12A and 12B which have associated start switches 42A and 42A' and start witches 42B and 452B', respectively. Switches 42A' and 42B' are associated with relatively small quantities of ingredient to be ground and start switches 42A and 42B are associated with relatively larger quantities of ingredient to be ground.

As best seen in FIG. 2C, the two hopper outlets are connected to a common grinding chamber inlet 16 by means of a manifold 50 with two converging branches 50A and 50. It is this manifold 50 and the grinding chamber 14 that is cleared of residue by the continuing operation of the grinding blades after the closure of the both of the hoppers 12A and 12B.

Referring now to FIG. 4, an improved embodiment of the controller 36 and other elements of the control system of the invention is seen to include inputs for the start switches 42A, 42B, 42A' and 42B'. In addition two other switch inputs may be provided for additional start switches 42A" and 42B" associated with other quantities of ingredient to be ground. The controller also has inputs for receiving AC power from an external source at inputs 62 which is also connected to the solenoids 38, 44A and 44B. The controller also include means for setting the preselected amounts of ingredients to be ground in association with the different start switches. This amount setting means includes an amount display 60 that that is used to variously indicate the ingredient amount and the start switch associated with the amount. An up programming switch 62 is used to increase the amount and a down programming switch 56 is used to decrease the amount. A set programming amount switch is used to set the amount that has been selected into the controller memory.

The controller 36 is preferably a T1683. It is capable of storing six different grind amounts or associated grinding cycle times. It also has a communications link 64 for control by the controller of a coffee brewer. When the link is established, the grinder time and hopper information is sent from the brewer and acted on by the controller 36. When the controller 36 is in the communication link mode, the start switches are disabled.

In the case of the controller controlling the amount of ingredient ground by means of timing, the grinding time is set by first pressing and holding pressed the set switch 58 for five seconds. The display 60 will show "SET" and then to program the time for a particular start switch, the start switch is pressed. This will cause the display to show the identification of the selected start witch being programmed, such a LH1 for the switch 42B. After the identification has been displayed, the display switch displays the current timer setting. The up switch 54 and the down switch are then used to increase and decrease the amount shown on the display 60. Pressing another start switch will then set the time selected for the first switch and the process is repeated for the next switch. After all the timers have been programmed, the set switch 58 is again actuated and control will return to normal operation.

If the controller 36 is set up to operate as a single hopper by means of a jumper inserted into the circuit, the solenoids for closure of the hopper and the termination of power to the motor occurs at the same time. However, in the dual hopper mode, which is achieved by removing the jumper, the grinder motor remains on after the gate solenoid has been actuated to close the hopper to vibrate and blow residue from the manifold 50, FIG. 2C.

In the case of the controller responding to the weight of the ingredient instead of the timer, the weight is displayed in the display 60 and the weight is changed through use of the switches 54, 56 and 58.

In such case, the method of the invention includes the steps of mounting a brew basket in alignment with the grinding chamber outlet to receive ground ingredient, directly measuring the quantity of ground ingredient received within the brew basket, and responding to the measuring means for controlling the powered cutting blades. The step of directly measuring includes the step of measuring the net weight of the ingredient within the brew basket. The step of measuring the net weight includes the steps of weighing the brew basket and the ingredient to determine the gross weight of both the ingredient and the brew basket, and subtracting the weight of only the brew basket from the gross weight to determine the net weight of only the ingredient in the brew basket. The quantity is preselected in the manner described above and the controller responds to the measuring means for terminating power to the powered cutting blades after the quantity of ground ingredient received within the brew basket equals the preselected quantity.

Again, an important aspect used in the weighing control method in addition to the timing method is that the step of terminating power includes the steps of establishing a time delay period, responding to the quantity of ground ingredient received within the brew basket equaling the preselected quantity to start the time delay period, and responding to lapse of the time delay period to terminate power to powered cutting blades. The grinding time delay period is preferably on the order of seven seconds.

Thus, in accordance with the aspect of the invention that results in cleaning the interior surfaces of residue ground ingredient a control system is provided that comprises closure member mounted for movement between a non-blocking position to a blocking position in which passage of unground ingredient from the ingredient hopper to the grinding chamber is blocked, an actuator for automatically moving the closure member from the nonblocking position to the blocking position when a preselected amount of ingredient has been ground during a grinding cycle and means for automatically terminating power to the electric motor only after a preselected time period after automatic movement by the actuator of the closure member from the nonblocking position to the blocking position. The automatically terminating means includes means for sensing when the actuator has moved the closure to the blocking position, and a timer 36A for measuring the preselected time period, means responsive to lapse of the preselected time period being measured by the timer to terminate power to the electric motor.

Referring now to FIGS. 4A and 4C, The controller operates in accordance with the flow chart that is shown. After the start of the program at 60, in step 62 a determination is made as to whether a start switch is has been actuated. If a switch has been actuated, then in step 64 the initial control conditions are set. In the case of a timing control, the timer is set and comparison is begun with respect to the time period that has been preselected for the particular switch that has been actuated. In the case of the weighing control embodiment, the weight of the brew basket and filter is determined and stored from subtraction from the gross weight less the empty weight of the brew basket is then begun to be compared to the weight that has been preselected for the particular switch that has been actuated.

Then in step 66, the appropriate hopper outlet gate solenoid is actuated to open the hopper outlet, and in step 68 the motor power solenoid is actuated to turn on the motor.

Then, in step 70 a determination is made as to whether an end grind cycle condition has occurred. Referring to FIG. 4C, in the case of the control being based on time, then the step 70 corresponds to step 70' in which a determination is made as to whether the time period selected for the grind cycle has passed or lapsed. If the time period has lapsed then the program proceeds to step 72. Referring to FIG. 4D, in the case of control being based on weight, then the step 70 corresponds to the step 70" in which a determination is made as to whether the net weight has been achieved. If the net weight equals the preselected net weight then the program proceeds to step 72.

In step 72, the hopper outlet gate is deactuated to close and the program proceed through junction 4—4 to step 74 in FIG. 4B, In step 74, a determination is made as to whether the controller is in the dual mode of operation. If the dual mode of operation has been selected then the program proceeds to step 76 in which the start motor off time delay period is started. In step 78 a determination is then made as to whether the time delay period has lapsed. Once the delay time period has lapsed then in step 80 the motor power solenoid is finally deactuated and the motor is turned off. In step 82, the program then returns to start.

While a particular embodiment of the invention has been disclosed in detail for purposes of illustration of the invention it should be appreciated that many variation may be made thereto without departing from the spirit and scope of the invention as set forth in the following claims.

What is claimed is:

1. In a grinder assembly for grinding a food ingredient having a frame, an ingredient hopper and a grinding chamber with an inlet for receiving unground ingredient from the hopper, powered grinding blades for grinding the ingredient and an outlet mounted to the frame, the improvement being a control system, comprising:
   means for mounting a brew basket in alignment with the grinding chamber outlet to receive ground ingredient;
   means for directly measuring the quantity of ground ingredient received within the brew basket; and
   means responsive to the measuring means for controlling the powered cutting blades including
   means for storing a preselected ingredient quantity and means responsive to the measuring means for terminating power to the powered cutting blades after the quantity of ground ingredient received within the brew basket equals the preselected quantity including
      means for establishing a time delay period,
      means responsive to the quantity of ground ingredient received within the brew basket equaling the preselected quantity to start the time delay period, and
      means responsive to lapse of the time delay period to terminate power to powered cutting blades.

2. The grinder assembly of claim 1 in which the time delay period is approximately seven seconds.

3. In a grinder assembly for grinding a food ingredient having a frame, an ingredient hopper and a grinding chamber with an inlet for receiving unground ingredient from the hopper, powered grinding blades for grinding the ingredient and an outlet mounted to the frame, the improvement being a control system, comprising:
   a brew basket having a body extending between a bottom with a downwardly facing surface with a preselected configuration and an open top for receipt of ground ingredient;
   a support member with an upwardly facing surface conforming to the preselected configuration of the downwardly facing surface, for providing underlying support of the brew basket body in a stable, level, upright position, with the open top facing vertically upwardly toward the grinding chamber outlet to receive ground ingredient and;
   means for directly measuring the quantity of ground ingredient received within the brew basket including means located beneath the substantially planer support member and linked to the support member for weighing the brew basket and any ingredient contained within the brew basket when resting in the stable, level, upright position upon the conforming upwardly facing surface of the su ort member; and
   means responsive to the directly measuring means located beneath the support member for controlling the powered cutting blades.

4. The grinder assembly of claim 3 in which the preselected configuration of the downwardly facing surface of the bottom of the brew basket is substantially planer and the upwardly facing conforming surface of the support member is substantially planer to support the brew basket in the substantially upright, level position.

5. In a grinder assembly for grinding a food ingredient having a frame, an ingredient hopper and a grinding chamber with an inlet for receiving unground ingredient from the hopper, powered grinding blades for grinding the ingredient and an outlet mounted to the frame, the improvement being a control system, comprising:
   means for mounting a brew basket in alignment with the grinding chamber outlet to receive ground ingredient;
   means for directly measuring the quantity of ground ingredient received within the brew basket; and
   means responsive to the measuring means for controlling the powered cutting blades and in which
      the ingredient hopper has
         an outlet opening for passing unground ingredient to the grinding chamber, and
         a closure member mounted for movement between
            a closed position in which the closure member is in a blocking position to close the outlet opening, and an open position in which the outlet opening is not blocked and enabled to drop ingredient directly into the grinding chamber, and in which the controlling means includes means for selectively controlling the movement of the closure member between the closed position and the open position in response to the measuring means.

6. The grinder assembly of claim 5 in which the controlling means includes means for weighing the brew basket when aligned with the grinding chamber outlet, and means for moving the closure member to the closed position when the weight of the brew basket and the ingredient within the brew basket exceeds a preselected weight.

7. The grinder assembly of claim 6 in which the moving means includes a solenoid engagable with the closure member, and means for selectively energizing the solenoid to move the closure member between the open and closed positions.

8. The grinder assembly of claim 7 in which the solenoid is spring biased to move the closure member to the closed position when the solenoid is not energized.

9. The grinder assembly of claim 7 in which the solenoid has a pusher member for pushing the closure member to the open position.

10. In a method practiced in a grinder assembly for grinding a food ingredient having a frame, an ingredient hopper and a grinding chamber with an inlet for receiving unground ingredient from the hopper, powered grinding blades for grinding the ingredient and an outlet mounted to the frame, the method being a method of grinding the ingredient comprising the steps of:

mounting a brew basket in alignment with the grinding chamber outlet to receive ground ingredient;

directly measuring the quantity of ground ingredient received within the brew basket; and responding to the measuring means for controlling the powered cutting blades, said step of controlling includes the steps of storing a preselected ingredient quantity, and responding to the measuring means for terminating power to the powered cutting blades after the quantity of ground ingredient received within the brew basket equals the preselected quantity the step of terminating power including the steps of establishing a time delay period, responding to the quantity of ground ingredient received within the brew basket equaling the preselected quantity to start the time delay period, and responding to lapse of the time delay period to terminate power to powered cutting blades.

11. The grinding method of claim 10 in which the time delay period is on the order of seven seconds.

12. In a method practiced in a grinder assembly for grinding a food ingredient having a frame, an ingredient hopper and a grinding chamber with an inlet for receiving unground ingredient from the hopper, powered grinding blades for grinding the ingredient and an outlet mounted to the frame, the method being a method of grinding the ingredient comprising the steps of:

mounting a brew basket having a body that extends between a bottom with a downwardly facing bottom surface having a preselected configuration and an open top in alignment with the grinding chamber outlet to receive ground ingredient, the step of mounting including the steps of moving the bottom support surface of the brew basket into a position in which underlying support of the weight of the brew basket is provided with a support member having an upwardly facing support surface with a configuration that conforms to the preselected configuration of the downwardly facing bottom surface to support the brew basket body in a stable, level, upright position with the open top facing vertically upwardly toward the grinding chamber outlet when the brew basket is aligned with the grinding chamber outlet;

directly measuring the quantity of ground ingredient received within the brew basket with a weight measuring element lined to the support member for weighing the brew basket and any ingredient contained within the brew basket; and responding to the measuring means for controlling the powered cutting blades.

13. The method of claim 12 in which the preselected configuration of the downwardly facing surface of the bottom of the brew basket is substantially planer and the upwardly facing conforming surface of the support member is substantially planer to support the brew basket in the substantially upright, level position.

14. A method practiced in a grinder assembly for grinding a food ingredient having a frame, an ingredient hopper and a grinding chamber with an inlet for receiving unground ingredient from the hopper, powered grinding blades for grinding the ingredient and an outlet mounted to the frame, the method being a method of grinding the ingredient comprising the steps of:

mounting a brew basket in alignment with the grinding chamber outlet to receive ground ingredient;

directly measuring the quantity of ground ingredient received within the brew basket;

responding to the measuring means for controlling the powered cutting blades, and in which the ingredient hopper has an outlet opening for passing unground ingredient to the grinding chamber; and including the steps of selectively moving a closure member between a closed position in which the closure member is in a blocking position to close the outlet opening, and an open position in which the outlet opening is not blocked and enabled to pass ingredient to the grinding chamber; and in which the step of controlling includes selectively controlling the movement of the closure member in response to the measuring means.

15. The grinding method of claim 14 in which the step of controlling includes the steps of weighing the brew basket when aligned with the grinding chamber outlet, and moving the closure member to the closed position when the weight of the brew basket and the ingredient within the brew basket exceeds a preselected weight.

16. The grinding method of claim 14 in which the step of moving includes the steps of locating a solenoid at a location at which the solenoid is engagable with the closure member, and selectively energizing the solenoid to move the closure member between the open and closed positions.

17. The grinding method of claim 16 in which the solenoid is spring biased to move the closure member to the closed position when the solenoid is not energized.

18. The grinding method of claim 15 in which the solenoid has a pusher member and including the step of pushing the closure member to the open position with the pusher member.

19. A grinder assembly for grinding a food ingredient having a frame, an ingredient hopper with an outlet, and a grinding chamber with an inlet for receiving unground ingredient from the hopper, an electric motor, powered grinding blades in the grinding chamber for grinding the ingredient, and an outlet chute mounted to the frame for passing ground ingredient out from the grinding chamber, improvement being a control system, comprising:

a closure member mounted for movement between a nonblocking position to a blocking position in which passage of unground ingredient from the ingredient hopper to the grinding chamber is blocked;

an actuator for automatically moving the closure member from the nonblocking position to the blocking position when a preselected amount of ingredient has been ground during a grinding cycle; and means for automatically terminating power to the electric motor only after a preselected time period after automatic movement by the actuator of the closure member from the nonblocking position to the blocking position.

20. The grinder assembly of claim 19 in which the automatically terminating means includes means for sensing when the actuator has moved the closure to the blocking position, and a timer for measuring the preselected time period, means responsive to lapse of the preselected time period being measured by the timer to terminate power to the electric motor.

21. The grinder assembly of claim 20 in which the time period is on the order of seven seconds.

22. A method practiced in a grinder assembly for grinding a food ingredient having a frame, an ingredient hopper with an outlet, and a grinding chamber with an inlet for receiving unground ingredient from the hopper, an electric motor, powered grinding blades in the grinding chamber for grinding the ingredient, and an outlet chute mounted to the frame for passing ground ingredient out from the grinding chamber, the method being a method of controlling the grinder comprising the steps of:

automatically moving a closure member from a nonblocking position to a blocking position blocking position in which passage of unground ingredient from the ingredient hopper to the grinding chamber is blocked when a preselected amount of ingredient has been ground during a grinding cycle; and automatically terminating power to the electric motor only after a preselected time period after automatic movement by the actuator of the closure member from the nonblocking position to the blocking position.

23. The method of claim 22 in which the step of automatically terminating means includes the steps of sensing when the actuator has moved the closure to the blocking position, and measuring the preselected time period, responding to lapse of the preselected time period being measured by the timer to terminate power to the electric motor.

24. The method of claim 23 in which the time period is on the order of seven seconds.

* * * * *